(12) United States Patent
Springmann et al.

(10) Patent No.: US 7,611,169 B2
(45) Date of Patent: Nov. 3, 2009

(54) DEVICE FOR COUPLING A COOLANT SUPPLY TO A ROLLER

(75) Inventors: Georg Springmann, Mülheim/Ruhr (DE); Dieter Warmbier, Moers (DE); Dirk Hasselbrink, Duisburg (DE); Wilbert Stoy, Ratingen (DE); Michael Steuten, Moers (DE); Ulrich Zenz, Duisburg (DE); Eberhard Steinfort, Duisburg (DE)

(73) Assignees: Georg Springmann Industrie- und Bergbautechnik GmbH, Muelheim/Ruhr (DE); SMS Siemag Aktiengesellschaft, Duesseldorf (DE)

( * ) Notice: Subject to any disclaimer, the term of this patent is extended or adjusted under 35 U.S.C. 154(b) by 378 days.

(21) Appl. No.: 10/552,791

(22) PCT Filed: Mar. 29, 2004

(86) PCT No.: PCT/DE2004/000680

§ 371 (c)(1),
(2), (4) Date: Jan. 13, 2006

(87) PCT Pub. No.: WO2004/091830

PCT Pub. Date: Oct. 28, 2004

(65) Prior Publication Data

US 2006/0108102 A1 May 25, 2006

(30) Foreign Application Priority Data

Apr. 10, 2003 (DE) .............................. 103 16 673

(51) Int. Cl.
*F16L 27/00* (2006.01)
*F16L 39/04* (2006.01)
*F16L 41/00* (2006.01)
*F16L 51/02* (2006.01)

(52) U.S. Cl. .............. 285/122.1; 285/121.3; 285/125.1; 285/226

(58) Field of Classification Search ................. 285/226, 285/299, 49, 114, 121.3, 121.4, 122.1, 125.1, 285/128.1
See application file for complete search history.

(56) References Cited

U.S. PATENT DOCUMENTS 1,688,172 A * 10/1928 Aldrich et al. ................. 285/61
1,859,975 A * 5/1932 Malkin ......................... 285/61

(Continued)

FOREIGN PATENT DOCUMENTS

AT         000 687         3/1996

(Continued)

*Primary Examiner*—James M Hewitt
(74) *Attorney, Agent, or Firm*—Collard & Roe, P.C.

(57) ABSTRACT

A device for coupling a coolant supply to a roller, especially for continuous casting installations mounts the roller in a pillow block via journals and roller bearings. The roller can be supplied with a coolant via at least one axial borehole guided through the journals. The device includes a sealing unit, preferably in the form of an elastic sleeve, that can be fixed to the journal in a pressure-tight manner, in order to carry out the coupling to the borehole and a pillow block cover that can be fixed to the pillow block for covering the borehole and includes at least one coolant channel that can be connected to the coolant supply. An insert can be introduced into the pillow block cover in order to couple the borehole to the coolant channel.

21 Claims, 6 Drawing Sheets

U.S. PATENT DOCUMENTS

| | | | |
|---|---|---|---|
| 2,196,676 A * | 4/1940 | Johnson et al. | 277/504 |
| 2,366,809 A * | 1/1945 | Seemann | 285/121.3 |
| 2,381,432 A * | 8/1945 | Bratton | 34/124 |
| 2,673,748 A * | 3/1954 | Shaw | 285/121.4 |
| 2,794,659 A * | 6/1957 | Bily | 285/121.4 |
| 2,805,087 A * | 9/1957 | Shaw et al. | 285/121.4 |
| 3,195,931 A * | 7/1965 | Braunagel | 285/70 |
| 3,484,853 A * | 12/1969 | Junjiro | 285/93 |
| 3,501,174 A * | 3/1970 | Gordon | 285/279 |
| 3,514,127 A * | 5/1970 | Edward | 285/41 |
| 3,692,337 A * | 9/1972 | Mischel | 285/226 |
| 3,801,142 A * | 4/1974 | Jones et al. | 285/280 |
| 5,011,166 A * | 4/1991 | Watts | 277/379 |
| 5,048,847 A * | 9/1991 | Kovacs et al. | 277/318 |
| 5,110,162 A * | 5/1992 | Peter et al. | 285/281 |
| 5,159,811 A * | 11/1992 | Hefler et al. | 60/322 |
| 5,538,292 A * | 7/1996 | Sommer | 285/13 |
| 5,617,879 A * | 4/1997 | Kubala | 285/95 |
| 5,669,636 A * | 9/1997 | Kubala | 285/98 |
| 5,944,363 A * | 8/1999 | Cwik et al. | 285/226 |
| 5,992,901 A * | 11/1999 | Gohres et al. | 285/121.2 |
| 6,032,463 A * | 3/2000 | Bock | 60/323 |
| 7,004,509 B2* | 2/2006 | Beach et al. | 285/281 |
| 2003/0116964 A1* | 6/2003 | Springmann et al. | 285/226 |
| 2004/0012199 A1* | 1/2004 | Beach et al. | 285/272 |
| 2004/0262915 A1* | 12/2004 | Hucker et al. | 285/272 |
| 2007/0228726 A1* | 10/2007 | Springmann et al. | 285/280 |

FOREIGN PATENT DOCUMENTS

| | | |
|---|---|---|
| DE | 42 07 042 C | 9/1993 |
| DE | 197 52 336 | 4/1999 |
| EP | 0 519 904 | 12/1992 |
| EP | 1 034 059 | 9/2000 |
| EP | 1 048 880 | 11/2000 |
| WO | WO 97/15763 | 5/1997 |
| WO | WO 99/26745 | 6/1999 |
| WO | WO 03/004919 | 1/2003 |

* cited by examiner

DEVICE FOR COUPLING A COOLANT SUPPLY TO A ROLLER

CROSS REFERENCE TO RELATED APPLICATIONS

Applicants claim priority under 35 U.S.C. §119 of German Application No. 103 16 673.4 filed Apr. 10, 2003. Applicants also claim priority under 35 U.S.C. §365 of PCT/DE2004/000680 filed Mar. 29, 2004. The international application under PCT article 21(2) was not published in English.

The invention relates to a device for coupling a coolant supply to a roller, in particular for continuous casting installations.

In the case of continuous casting installations, red-hot steel runs in continuous strand form over rollers which are mounted, on their ends, via journals in a pillow block by means of roller bearings. The rollers are cooled in a closed loop by means of supplying a pressurized coolant (in particular water) into the interior of the roller in order to remove the heat, which can be realized, for example, by the water duct via an axial roller borehole guided through the journals.

DE 42 07 042 C1 discloses a device for coupling the cooling medium supply to a supporting and/or transporting roller, in particular for continuous casting installations, in which each pillow block is covered by a cover. The cover has a cooling duct which is connected to a further cooling duct in the pillow block for connecting to a coolant supply means or coolant removal means and leads at its other end into the region of the journal borehole. The encapsulated unit which is formed in this manner enables the structural elements to be relatively well protected against wear, since the structural elements are protected against the partly aggressive surroundings of the continuous casting installation (e.g. splash water) and against external mechanical influences.

However, this device firstly has the drawback that the elements of pillow block and pillow block cover that are adjusted precisely to each other in order to form the coolant duct make it difficult to refit existing continuous casting installations. Above all, however, it is difficult for maintenance work to be carried out on this device because the entire pillow block cover has to be removed in order to permit access to the structural elements (the elastic compensator, the sealing units provided thereon, roller bearings, etc.) covered by said cover.

Therefore, the present invention is based on the object of providing a device for coupling a coolant supply to a roller, in which the flexibility both with regard to the installation thereof and also with regard to the carrying out of maintenance work and the exchanging of individual components is increased.

This object is achieved according to the features of patent claim 1 by the fact that a device for coupling a coolant supply to a roller, in particular for continuous casting installations, the roller being mounted in a pillow block by means of roller bearings via journals and being able to be supplied with a coolant via at least one axial roller bore guided through the journals, has a pillow block cover, which can be fixed to the pillow block in order to cover the roller bore, and at least one coolant duct which can be connected to the coolant supply, and includes a sealing unit arranged between the roller bore and the pillow block cover, whereby an insert which supports the sealing unit in the fitted state is insertable into the pillow block cover, and whereby the insert, in order to couple the coolant duct via the sealing unit to the roller bore, has at least one coolant duct which, in the fitted state, is coupled to the coolant duct in the pillow block cover and to the sealing unit.

Due to the fact that, in the case of the device according to the invention, an insert for coupling the roller bore to the coolant duct is insertable into the pillow block cover, whereby the sealing unit is provided as means for sealing off the insert with respect to the roller bore, it is ensured that—when the insert is removed from the pillow block cover —there can be access from the outside, in particular to the sealing unit, for example in order to carry out maintenance work, without the entire pillow block cover having to be removed. On the other hand—with the insert fitted in the pillow block cover—effective protection against wear continues to be ensured by the formation of a coolant duct which is optimally protected toward the outside.

In addition, the retrofitting of the device according to the invention in an already existing continuous casting installation can more easily be carried out, since all of the means characterizing the invention are provided on the pillow block cover and therefore, the functioning of the device according to the invention is independent of the construction of the pillow block. As a result of the sealing unit, which is provided on the insert, as means for sealing off the insert with respect to the roller bore, the device is furthermore also independent of the specific configuration of the sealing elements necessary for the pressure-tight fixing of the inner rotary leadthrough components or the arrangement of the sealing surfaces.

According to a preferred embodiment, the sealing unit has an elastic sleeve, preferably in the form of a compensator, in a flange which is arranged in the roller journal and is preferably fixed releasably in the roller bore.

According to a preferred embodiment, the insert is constructed in such a manner that, when it is removed, it exposes fastening means for the releasable fastening of the sleeve and/or of the flange to the roller journal. Thus, for the removal of the elastic sleeve and of the flange, it is only necessary to remove the insert.

The insert preferably has at least one coolant duct which, in the fitted state, is coupled to a respective coolant duct in the pillow block cover.

According to a preferred embodiment, the insert has a first coolant duct and a second coolant duct which, in the fitted state, are coupled to a first coolant duct and a second coolant duct in the pillow block cover, respectively. The first coolant duct of the pillow block cover is preferably connectable to a coolant supply means and the second coolant duct is preferably connectable to a coolant removal means. In the case of this "duo-rotary union", the coolant is conducted back via the second coolant duct in the pillow block cover, for example to a pillow-block footprint, in order to be discharged therefrom.

According to a preferred embodiment, a connecting pipe is insertable into the at least one coolant duct of the pillow block cover for connecting to a pillow-block footprint, which is coupled to the coolant removal means and/or coolant supply means, so that the connection to the cooling water supply lines and removal lines, which are ground-routed, is ensured.

A particularly preferred embodiment of the device according to the invention is constructed in such a manner that the pillow block cover has a fastening collar by means of which the pillow block cover can be fixed to the pillow block via fastening screws and the region of the pillow block cover which is raised with respect to the fastening collar and into which the insert can be inserted has approximately the diameter of the order of magnitude of the distance between the roller bearings in the pillow block. In the raised region of the pillow block cover, the at least one cooling water duct, which leads away from the insert or to the insert, is pierced radially to the outside to the edge of the pillow block cover, this bore being closed in each case during operation of the continuous casting installation, preferably by means of a screw stopper. When the installation is at a standstill for maintenance work, this screw stopper can be unscrewed, thus enabling compressed air to be supplied in order to free the interior of the roller by blowing out the cooling water.

In a particularly preferred embodiment, the device according to the invention has a sealing unit which comprises two sealing rings, which run on each other, as sealing elements, the first sealing ring being supported by the insert and the second sealing ring being supported by the elastic sleeve. In the case of this embodiment, it is ensured that the tilting effects acting on the sealing unit when the roller is subjected to a load during operation are compensated as a result of the radial mobility of the sealing rings and of the elastic sleeve and thus, the service life of the device is increased.

Further embodiments of the invention can be gathered from the description below and the subclaims.

The invention is explained in more detail below with reference to two embodiments shown in the attached Figures, in which.

Figure 1:
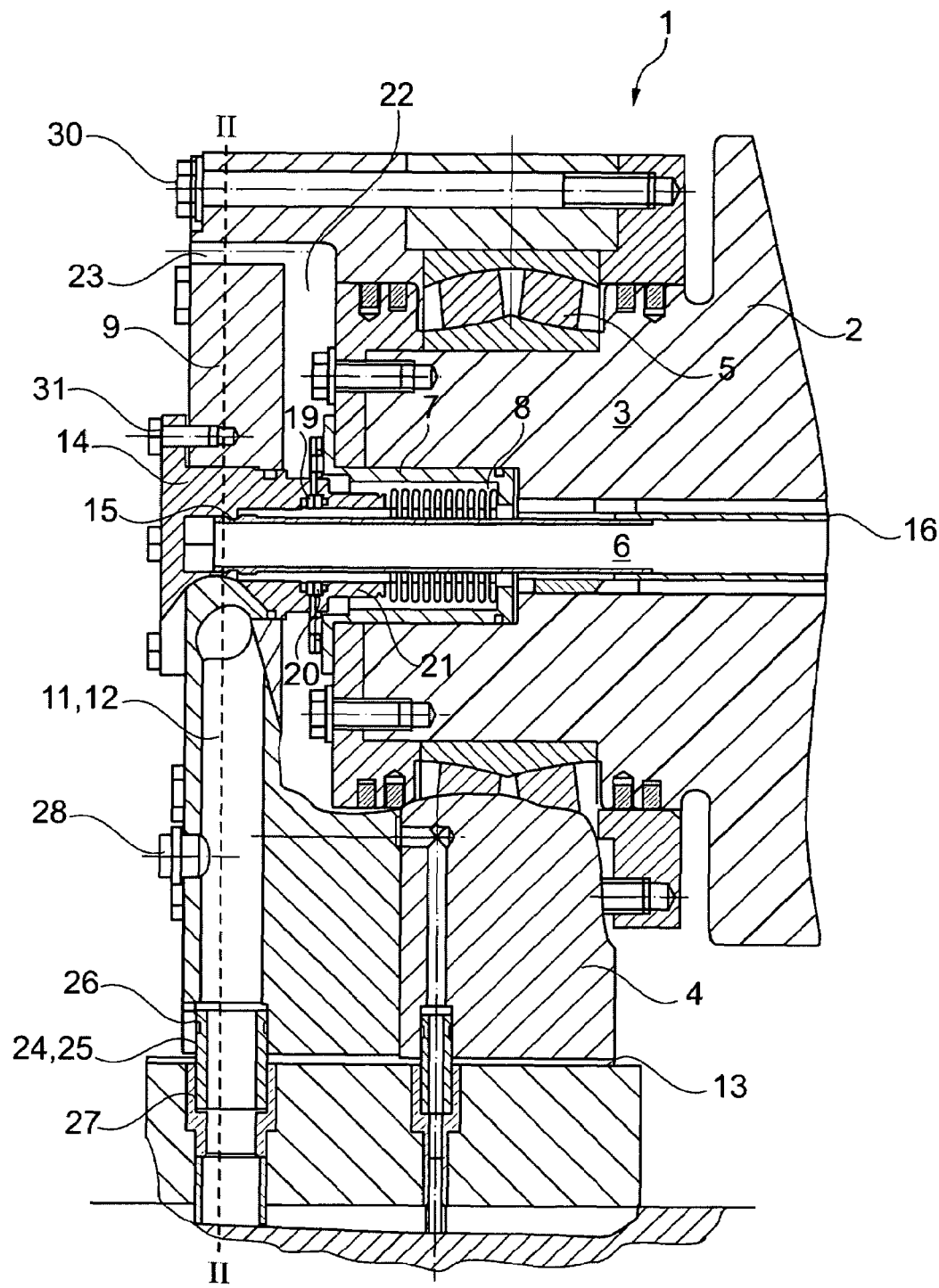
FIG. 1 shows a partial view of a first embodiment of the device according to the invention in longitudinal section.

According to FIG. 1, a device 1 according to the invention is used for coupling a coolant supply (not shown) to a roller 2 of a continuous casting installation, the roller 2 being mounted in a pillow block 4 by means of roller bearings 5 via a journal 3. The roller 2 can be supplied with a coolant via an axial roller-borehole 6 guided through the journal 3.

A flange 7 which is used for holding an elastic sleeve 8, which is preferably constructed as a compensator, is inserted into the roller journal 3. Besides the preferred embodiment of the sleeve in the form of a compensator made of stainless steel, the elastic sleeve may also be made of other materials which impart elasticity, for example in the form of a rubber hollow cylinder which is optionally reinforced with fabric and is fitted into the flange 7. This permits the sleeve 8 to be particularly flexible and reduces the wear of the device according to the invention when the roller is subjected to a load. In the embodiment as illustrated, the elastic sleeve 8 is fixed releasably in the flange 7.

A pillow block cover 9 is fixed on the pillow block 4. According to the embodiment as shown, the pillow block cover 9 has a first coolant duct 11 and, in the case of the cooling water being supplied and removed on the same side of the roller, a second coolant duct 12, with one end of the coolant duct 11 being connectable to a coolant supply means and one end of the coolant duct 12 being connectable to a coolant removal means (neither shown). The coolant ducts 11 and 12 according to the embodiment as shown have, according to FIG. 2, respective duct sections 11a and 12a, which lead to the pillow-block footprint 13 and are arranged perpendicularly with respect to the roller axis, and respective duct sections 11b and 12b which, at the other end of the respective section 11a and 12a, are angled/bended with respect thereto in the direction of the roller axis.

The pillow block cover 9 as shown in FIG. 1 virtually completely covers the side surface of the pillow block 4. In this case, an insert 14 with a siphon pipe 15 fixed to it in a pressure-tight manner is inserted into the pillow block cover 9. The siphon pipe 15 pointing to the interior of the roller is dimensioned in such a manner that it protrudes into the outwardly pointing end section of the guide pipe 16 for the cooling water, said guide pipe reaching into the interior of the roller and forms an annular gap between the pipes 15 00and 16. The annular gap is dimensioned in such a manner that, on the one hand, the pipes 15 and 16 are rotatable relative to each other and at the same time only a small flow rate of cooling water through them is permitted.

Figure 2:
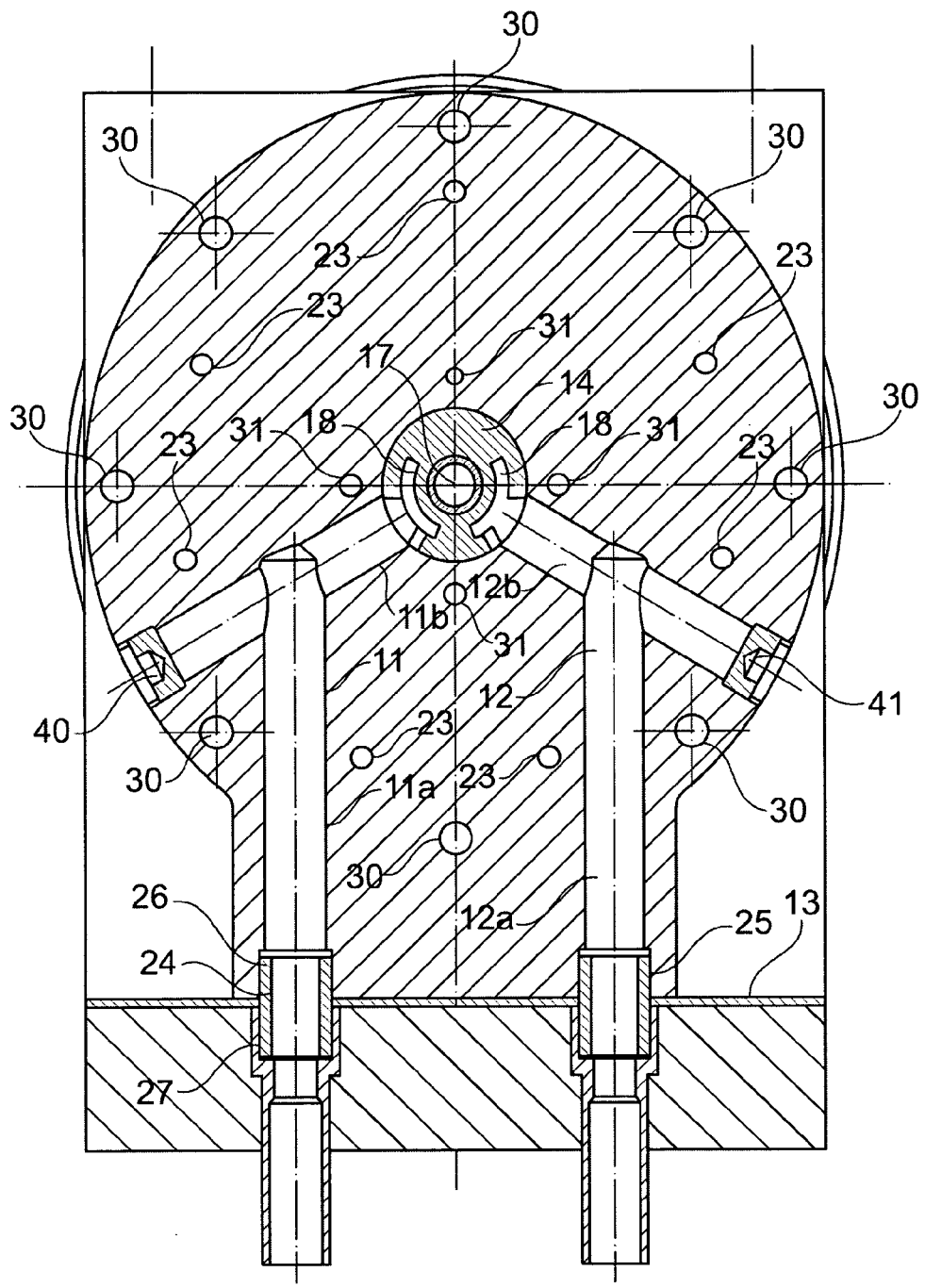
FIG. 2 shows a cross-sectional view of the first embodiment of the device according to the invention along line II-II from FIG. 1.

As shown in FIG. 2, the insert 14 has a first coolant duct 17, which is coupled to the siphon pipe 15, and, in the case of cooling water being supplied and removed on the same side of the roller, a second coolant duct 18 for removing the cooling water, as shown in the Figures. The coolant ducts 17 and 18 lead respectively to the duct sections 11b and 12b of the coolant ducts 11 and 12 in the pillow block cover 9 as well as to the roller borehole 6 at the other end in such a manner that the roller borehole is coupled to the coolant ducts 11 and 12 in order to supply and remove the cooling water.

According to FIG. 1, a sealing unit is provided between the insert 14 and the roller borehole 6, which sealing unit, according to the embodiment, has in particular a sealing ring, which is arranged on that end of the insert 14 which faces the flange 7, as sealing element 19 and, corresponding to the first sealing element 19, a further sealing element 20, which is constructed as a sealing ring, on an extension piece 21 arranged on the sleeve 8 at the end facing the pillow block cover 9. According to the embodiment 1, the sealing surfaces of the sealing elements 19 and 20 are therefore arranged perpendicularly with respect to the axis of rotation of the roller.

Said geometrical arrangement of the sealing surfaces of the sealing elements 19 and 20 is preferred, since the forces acting on the sealing elements can thus be better compensated, but this geometrical arrangement of the sealing surfaces of the sealing elements 19 and 20 is not necessarily required in the case of the device 1 according to the invention if other sealing units with sealing elements interacting in a different manner are used.

The pillow block cover 9 shown in FIG. 1 preferably has, in the region adjacent to the pillow block 4, an undercut region 22 with a preferably U-shaped cross section. The undercut region 22 has a larger diameter than the roller journal 3 and is used to collect cooling medium, which is escaping as a consequence of a possible leakage at the sealing unit and is flowing off vertically, and to remove it to the outside via the bores 23. The bores 23 are arranged, in particular equidistantly, along the circular circumference of the pillow block cover 9, and thus, it is reliably made possible in this manner, irrespective of the vertical orientation of the pillow block, for cooling medium which has escaped to be able to flow off and not to be able to penetrate into the region of the roller bearings 5.

Figure 3:
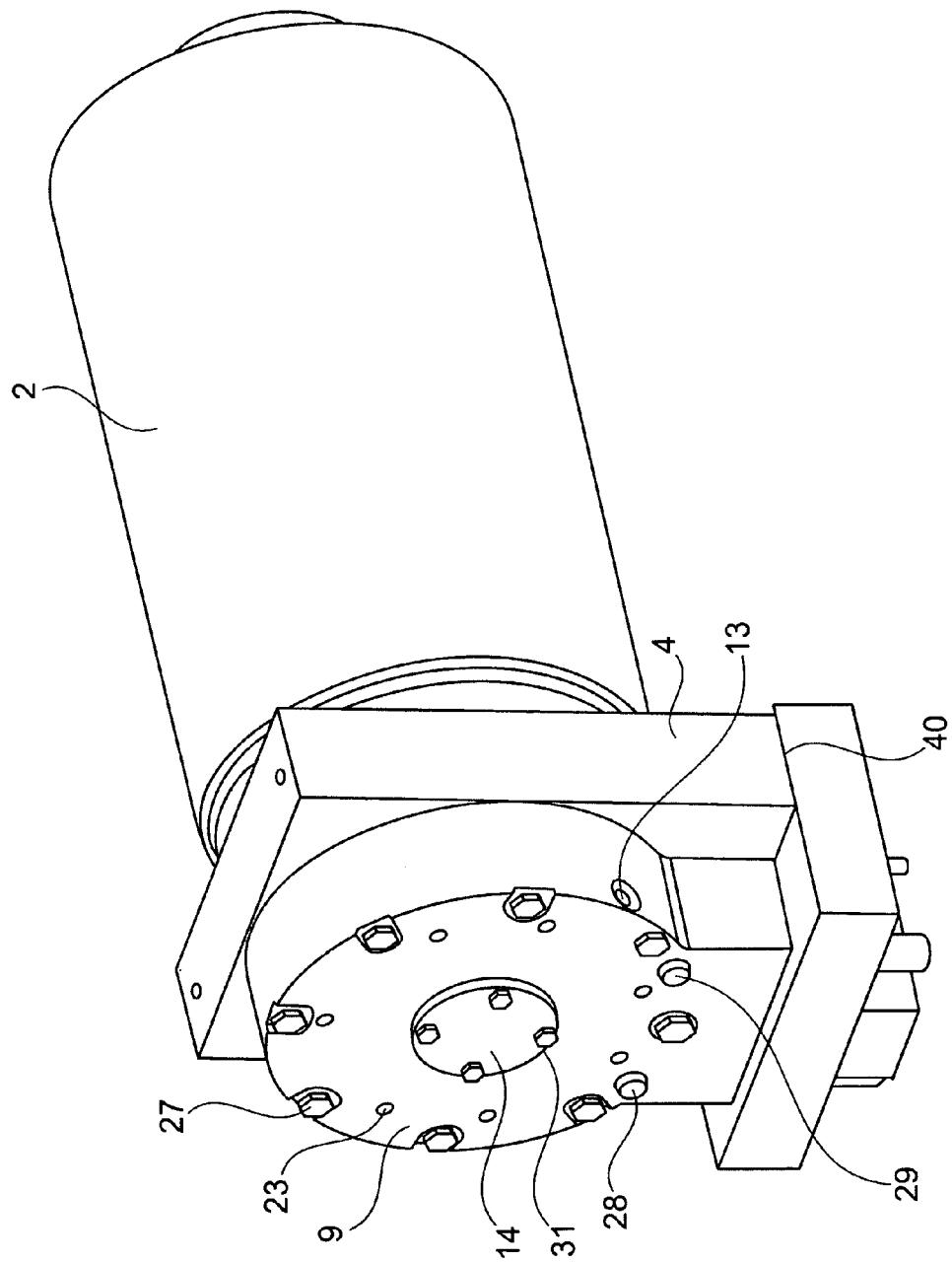
FIG. 3 shows a perspective partial view of the first embodiment of the device according to the invention.

As shown in FIG. 1 and FIG. 3, connecting pipes 24 and 25 are inserted into the ends, which facing away from the insert 13 respectively, of the coolant ducts 11 and 12 of the pillow block cover 9 and are thus connected to the pillow-block footprint 13 which is in turn coupled to the coolant removal means and/or coolant supply means (not shown). The connecting pipes 24 and 25 are sealed from the pillow block cover 9 and pillow-block footprint 13 in each case via O-ring seals 26 and 27 provided on either end-side end-sections.

The pillow block cover 9 is preferably provided with bores, which are coaxial with the roller axis, into the coolant ducts 11 and 12 which can be closed by closure stoppers 28 and 29 which can be screwed into them. The closure stoppers 28 and 29 can be unscrewed for maintenance work to the continuous casting installation, and thus, it is possible for a flushing medium, such as compressed air, to be supplied in order to free the interior of the roller by blowing out the cooling water and thus to facilitate the maintenance work.

According to FIGS. 1 to 3, the pillow block cover 9 is fastened to the pillow block 4 preferably in a releasable manner by means of fastening screws 30 which can be arranged, in particular equidistantly, along the circular circumference of the pillow block cover 9. The insert 14 is likewise fastened releasably to the pillow block cover by means of fastening screws 31. As a result, access from the outside to the components which are covered in the fitted state by the insert 14, in particular to the sealing unit, in order to carry out maintenance work can easily take place by release of the fastening screws 31 and subsequent removal of the insert 14 without a removal of the entire pillow block cover 9 from the device 1 being necessary for this. For this purpose, the insert 14 is preferably dimensioned in such a manner that, when the insert is removed, an access from the outside to the components which are covered, in the fitted state, by the insert 14, in particular to the sealing unit, is possible in such a manner that the sealing unit can be removed from the roller borehole owing to the unobstructed access to the fastening screws of the flange.

On the contrary, with the insert 14 fitted in the pillow block cover 9, firstly the coolant supplies 11, 12, 17 and 18 and secondly the sealing unit are protected against the aggressive surroundings of the continuous casting installation, and therefore, an excessive amount of wear is avoided.

Figure 4:
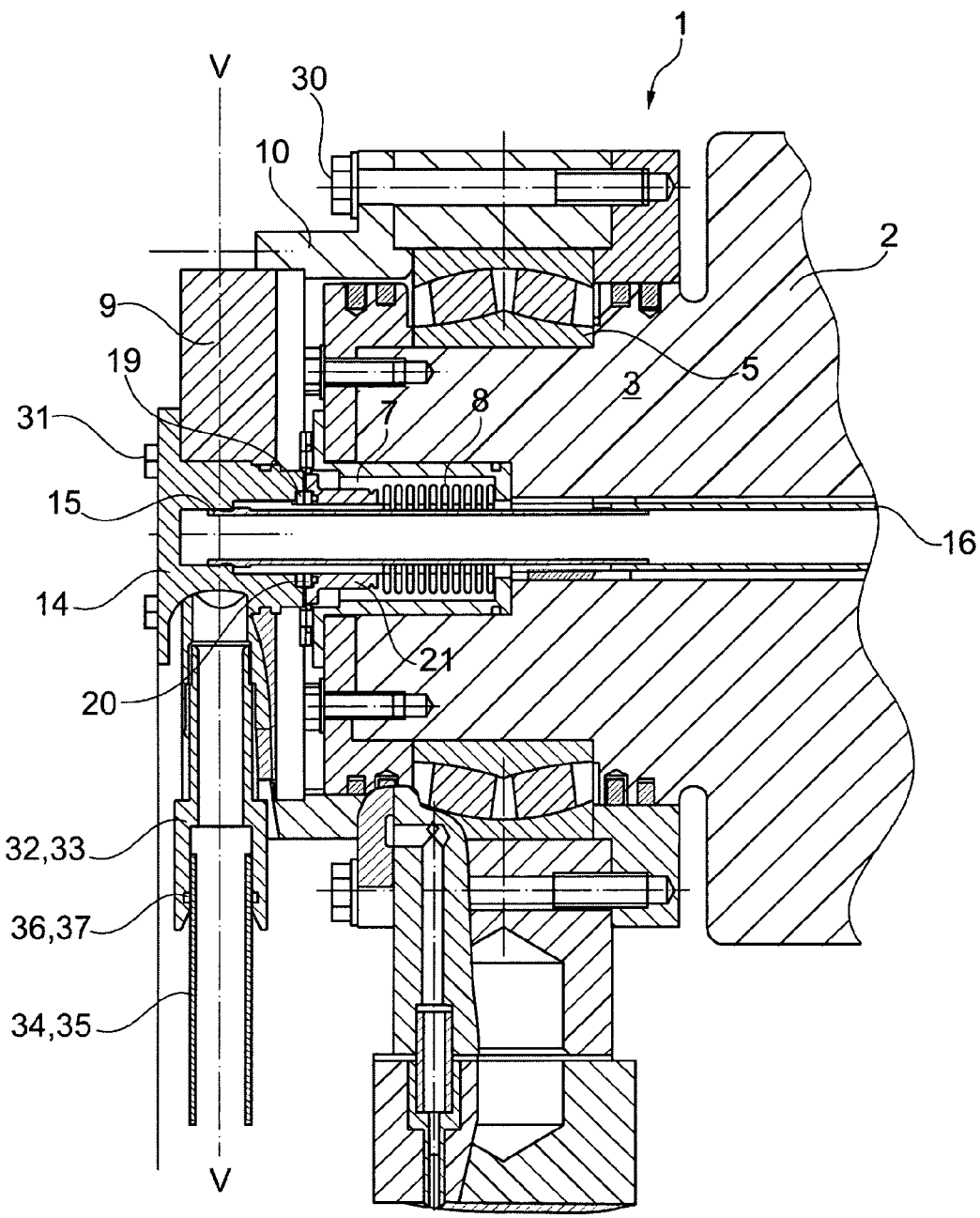
FIG. 4 shows a partial view of a second preferred embodiment of the device according to the invention in longitudinal section.

As in accordance with FIG. 1, the second embodiment of the device 1 according to the invention shown in FIG. 4 is used for coupling a coolant supply (not shown) to a roller 2 of a continuous casting installation, the roller 2 being mounted in a pillow block 4 by means of roller bearings 5 via a journal 3. The roller 2 can be supplied with a coolant via an axial roller borehole 6 guided through the journal 3. The embodiment shown in FIG. 4 can also preferably have—not shown in the drawing here but constructed in accordance with the illustration in FIG. 1—in the region adjacent to the pillow block 4 preferably an undercut region with a preferably U-shaped cross section, which is used to collect cooling medium, which is escaping as a consequence of possible leakage at the sealing unit and is flowing off vertically in the direction perpendicular with respect to the roller axis, and to remove it via bores leading to the outside.

Figure 5:
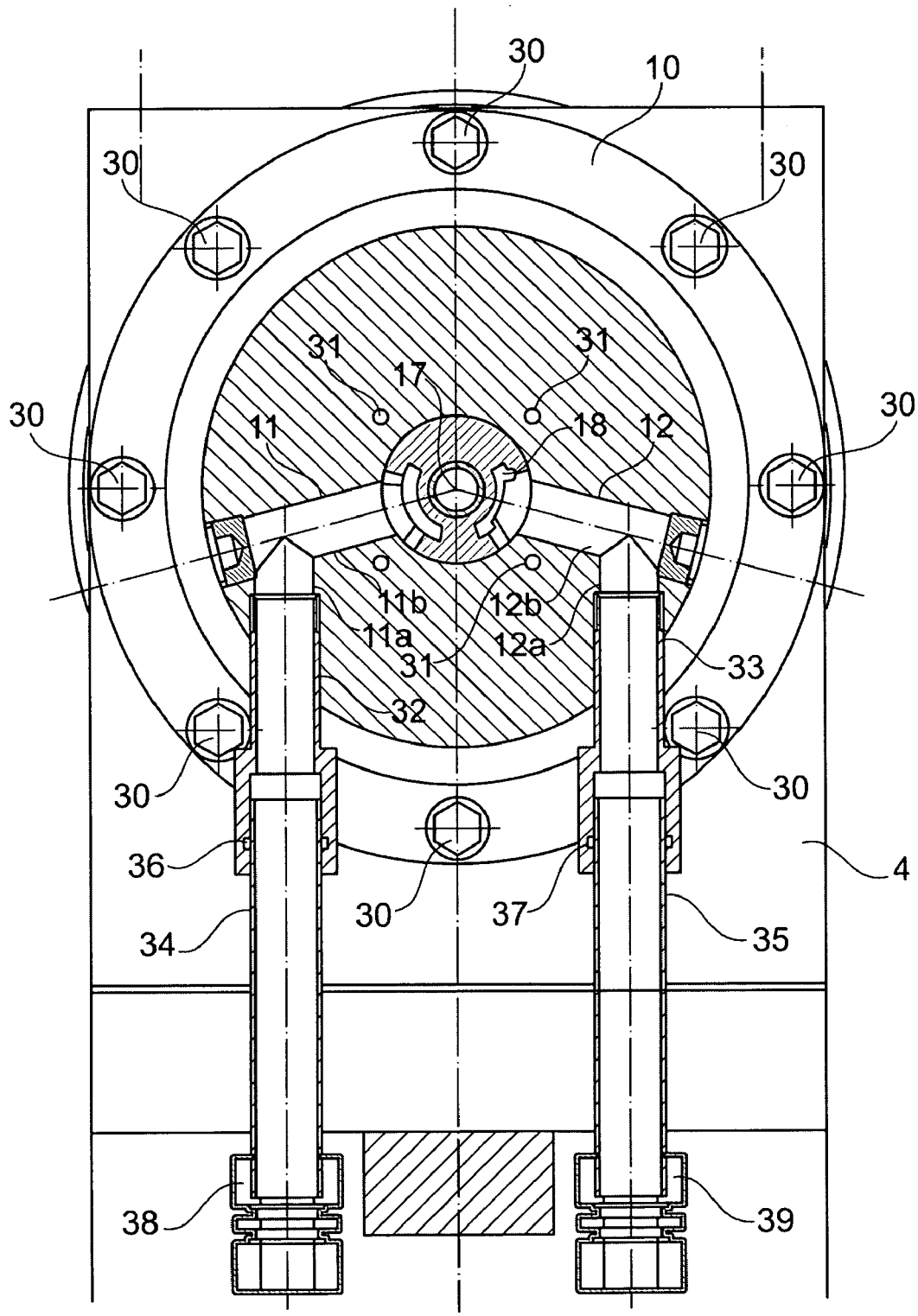
FIG. 5 shows a cross-sectional view of the second embodiment of the device according to the invention along line V-V from FIG. 4.
Figure 6:
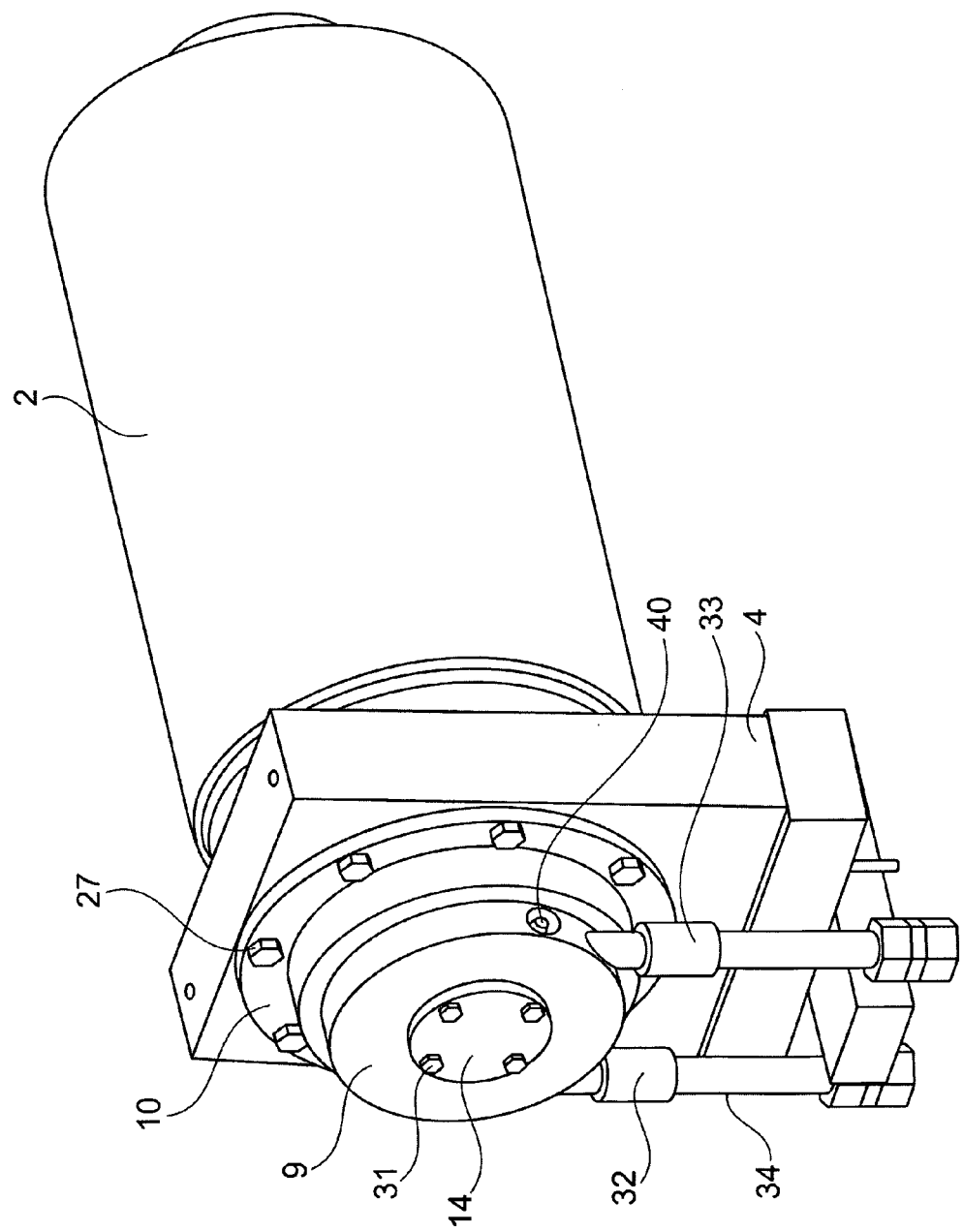
FIG. 6 shows a perspective partial view of the second embodiment of the device according to the invention.

In contrast to the embodiment shown in FIG. 1, the preferably circular pillow block cover 9, which is shown in longitudinal cross section in FIG. 4 and in FIG. 5 in radial cross section along line V-V from FIG. 4, has a fastening collar 10 by means of which the pillow block cover 9 is fixed to the pillow block with the fastening screws 30. The pillow block cover 9 shown in FIG. 4 and having the fastening collar 10 covers the side surface of the pillow block 4 approximately in the region of the cross-sectional surface of the roller.

In this case, the pillow block cover 9 has the first coolant duct 11 and, when the cooling water is supplied and removed on the same side of the roller, the second coolant duct 12, whereby the coolant ducts 11 and 12 according to the embodiment shown in FIG. 5 are having, in the duct sections 11a and 12a, which lead to the pillow-block footprint and are arranged perpendicularly with respect to the roller axis, respective plug-in receptacles 32 and 33 into which plug-in pipes 34 and 35, which lead to the pillow-block footprint and are intended for the supply and removal of the cooling water, are inserted. The plug-in receptacles 32 and 33 are preferably provided at their ends pointing toward the pillow block cover with external threads by means of which they can be screwed into the bores, which are provided with internal threads, in the pillow block cover.

The plug-in pipes 34 and 35 are sealed off from the plug-in receptacles 32 and 33 via the O-rings 36 and 37 and permit cooling medium, preferably cooling water, to be supplied to and removed from the ground-routed cooling water supply 38 and removal 39. In the duct sections 11b and 12b, respectively, which are angled in the direction of the roller axis, screw stoppers 40 and 41 are provided preferably arranged radially on the outside of the pillow block cover, which screw stoppers can be unscrewed during maintenance work on the continuous casting installation and thus permit a flushing medium, such as compressed air, to be supplied in order to free the interior of the roller by blowing out the cooling water and thus to facilitate the maintenance work.

The device according to the invention, in particular in the embodiment shown in FIGS. 4 and 5, can also easily be fitted in an already existing continuous casting installation, since all of the means characterizing the invention are provided on the pillow block cover, and the functioning of the device according to the invention is therefore independent of the design of the pillow block.

List of Reference Numbers

1 Device for coupling a coolant supply
2 Roller
3 Journal
4 Pillow block
5 Roller bearing
6 Axial roller bore
7 Flange
8 Elastic sleeve
9 Pillow block cover
10 Fastening collar
11 Coolant duct
12 Coolant duct
13 Pillow-block footprint
14 Insert
15 Siphon pipe
16 Guide pipe
17 Coolant duct
18 Coolant duct
19 Sealing ring
20 Sealing ring
21 Extension piece
22 Undercut region
23 Bore
24 Connecting pipe
25 Connecting pipe
26 O-ring
27 O-ring
28 Screw stopper
29 Screw stopper
30 Fastening screws
31 Fastening screws
32 Plug-in receptacle
33 Plug-in receptacle
34 Plug-in pipe
35 Plug-in pipe
36 O-ring
37 O-ring 38 Cooling water supply
39 Cooling water removal
40 Screw stopper
41 Screw stopper

The invention claimed is:

1. A device for coupling a coolant supply to a roller, the roller being mounted in a pillow block by means of roller bearings via a roller journal and being able to be supplied with a coolant via an axial roller borehole guided through the roller journal, having
   a sealing unit, which can be fixed to the roller journal to couple it to the roller borehole in a pressure-tight manner; and
   a pillow block cover, which can be fixed to the pillow block in order to cover the roller bore and which has at least first and second pillow block cover coolant ducts connectable to the coolant supply;
   wherein an insert, which supports the sealing unit in the fitted state, is insertable into the pillow block cover;
   wherein the insert has a first coolant duct and a second coolant duct which, in the fitted state, are coupled to the first and second pillow block cover coolant ducts in the pillow block cover, respectively; and
   wherein said first coolant duct and said second coolant duct of said insert, in order to couple the pillow block coolant ducts via the sealing unit in a pressure-tight manner to the roller bore, are coupled in the fitted state to the sealing unit.

2. The device as claimed in claim 1, wherein said sealing unit comprises an elastic sleeve, which is fixed in a flange arranged in the roller journal.

3. The device as claimed in claim 2, whereby the sleeve is removably fixed in the flange.

4. The device as claimed in claim 2, whereby the insert is constructed in such a manner that, when it is removed, it exposes fastening means for removably attaching at least one of the sleeve and the flange to the roller journal.

5. The device as claimed in claim 1, wherein the first pillow block cover coolant duct is connectable to a coolant supply means and the second pillow block cover coolant duct is connectable to a coolant removal means.

6. The device as claimed in claim 1, whereby the pillow block cover is attached to the pillow block by means of a fastening collar.

7. The device as claimed in claim 1, wherein at least one bore through the pillow block cover is provided for removing cooling medium which has penetrated into the gap between the pillow block cover and pillow block.

8. The device as claimed in claim 1, whereby the pillow block cover has, in the region adjacent to the pillow block, an undercut region with a U-shaped cross section for receiving cooling medium which has penetrated into the gap between the pillow block cover and pillow block.

9. A device for coupling a coolant supply to a roller, the roller being mounted in a pillow block by means of roller bearings via a roller journal and being able to be supplied with a coolant via an axial roller borehole guided through the roller journal, having
   a sealing unit, which can be fixed to the roller journal to couple it to the roller borehole in a pressure-tight manner; and
   a pillow block cover, which can be fixed to the pillow block in order to cover the roller bore and which has at least one coolant duct connectable to the coolant supply;
   wherein an insert, which supports the sealing unit in the fitted state, is insertable into the pillow block cover;
   wherein said insert, in order to couple the coolant duct via the sealing unit in a pressure-tight manner to the roller bore, has at least one coolant duct which, in the fitted state, is coupled to the coolant duct in the pillow block cover and to the sealing unit; and
   wherein a connecting pipe for connection to a pillow-block footprint, which is coupled to at least one of a coolant removal means and a coolant supply means, is insertable into the at least one coolant duct of the pillow block cover in such a manner that the connecting pipe is completely contained by the pillow block cover.

10. The device as claimed in claim 9, whereby at least one screw stopper which can be screwed in is arranged in the at least one coolant duct of the pillow block cover.

11. The device as claimed in claim 9, whereby said sealing unit comprises an elastic sleeve, which is fixed in a flange arranged in the roller journal.

12. The device as claimed in claim 11, whereby the sleeve is removably fixed in the flange.

13. The device as claimed in claim 11, whereby the insert is constructed in such a manner that, when it is removed, it exposes fastening means for removably attaching at least one of the sleeve and the flange to the roller journal.

14. A device for coupling a coolant supply to a roller, the roller being mounted in a pillow block by means of roller bearings via a roller journal and being able to be supplied with a coolant via an axial roller borehole guided through the roller journal, having
   a sealing unit, which can be fixed to the roller journal to couple it to the roller borehole in a pressure-tight manner; and
   a pillow block cover, which is attached to the pillow block by means of a fastening collar in order to cover the roller bore and which has at least one coolant duct connectable to the coolant supply;
   wherein a plug-in receptacle for receiving a plug-in pipe wherein a plug-in receptacle for receiving a plug-in pipe for connection to at least one of a cooling water supply and a cooling water removal, which is coupled to at least one of a coolant removal means and a coolant supply means, is insertable into the at least one coolant duct of the pillow block cover (9);
   wherein an insert, which supports the sealing unit in the fitted state, is insertable into the pillow block cover; and
   wherein said insert, in order to couple the coolant duct via the sealing unit in a pressure-tight manner to the roller bore, has at least one coolant duct which, in the fitted state, is coupled to the coolant duct in the pillow block cover and to the sealing unit.

15. The device as claimed in claim 14, wherein said sealing unit comprises an elastic sleeve, which is fixed in a flange arranged in the roller journal.

16. The device as claimed in claim 15, whereby the sleeve is removably fixed in the flange.

17. The device as claimed in claim 15, whereby the insert is constructed in such a manner that, when it is removed, it exposes fastening means for removably attaching at least one of the sleeve and the flange to the roller journal.

18. A device for coupling a coolant supply to a roller, the roller being mounted in a pillow block by means of roller bearings via a roller journal and being able to be supplied with a coolant via an axial roller borehole guided through the roller journal, having
   a sealing unit, which can be fixed to the roller journal to couple it to the roller borehole in a pressure-tight manner; and a pillow block cover, which can be fixed to the pillow block in order to cover the roller bore and which has at least one coolant duct connectable to the coolant supply;

wherein an insert, which supports the sealing unit in the fitted state, is insertable into the pillow block cover;

wherein said insert, in order to couple the coolant duct via the sealing unit in a pressure-tight manner to the roller bore, has at least one coolant duct which, in the fitted state, is coupled to the coolant duct in the pillow block cover and to the sealing unit; and wherein the sealing unit comprises two sealing rings, which run on each other, as sealing elements, the first sealing ring being supported by the insert and the second sealing element being supported by an elastic sleeve.

19. The device as claimed in claim 18, wherein said sealing unit comprises an elastic sleeve, which is fixed in a flange arranged in the roller journal.

20. The device as claimed in claim 19, whereby the sleeve is removably fixed in the flange.

21. The device as claimed in claim 19, whereby the insert is constructed in such a manner that, when it is removed, it exposes fastening means for removably attaching at least one of the sleeve and the flange to the roller journal.

* * * * *

UNITED STATES PATENT AND TRADEMARK OFFICE
CERTIFICATE OF CORRECTION

PATENT NO. : 7,611,169 B2
APPLICATION NO. : 10/552791
DATED : November 3, 2009
INVENTOR(S) : Springmann et al.

It is certified that error appears in the above-identified patent and that said Letters Patent is hereby corrected as shown below:

In Column 7, line 25 (Line 20 of Claim 1) after the word "block" please insert: --cover--.
In Column 8, line 15 (Line 1 of Claim 11) please change "whereby" to: --wherein--.
In Column 8, line 37 (Line 14 of Claim 14) please delete: "wherein a plug-in receptacle for receiving a plug-in pipe." (second occurrence).
In Column 8, line 42 (Line 19 of Claim 14) after the word "cover", please delete: "(9)".

Signed and Sealed this

Twenty-seventh Day of April, 2010

David J. Kappos
*Director of the United States Patent and Trademark Office*

UNITED STATES PATENT AND TRADEMARK OFFICE
CERTIFICATE OF CORRECTION

PATENT NO. : 7,611,169 B2  Page 1 of 1
APPLICATION NO. : 10/552791
DATED : November 3, 2009
INVENTOR(S) : Springmann et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 766 days.

Signed and Sealed this

Twelfth Day of October, 2010

David J. Kappos
*Director of the United States Patent and Trademark Office*